United States Patent

[11] 3,569,728

[72] Inventor Carl E. Atkins
Montclair, N.J.
[21] Appl. No. 816,648
[22] Filed Apr. 16, 1969
[45] Patented Mar. 9, 1971
[73] Assignee Wagner Electric Corporation

[54] CAPACITANCE-RESPONSIVE CIRCUIT
10 Claims, 4 Drawing Figs.

[52] U.S. Cl. 307/116, 340/258, 200/52
[51] Int. Cl. H01h 35/00
[50] Field of Search 307/116, 125; 200/52 (CAP); 340/258 (CX)

[56] References Cited

UNITED STATES PATENTS 3,109,893 11/1963 Burns 200/52CAP
3,197,658 7/1965 Byrnes et al. 307/116
3,276,005 9/1966 Quist et al. 340/258C
3,406,802 10/1968 Needham et al. 307/116X

*Primary Examiner*—Robert K. Schaefer
*Assistant Examiner*—H. J. Hohauser
*Attorney*—Eyre, Mann and Lucas

ABSTRACT: A capacitance responsive circuit employing a blocking oscillator to convert low voltage direct current power into high frequency bursts of alternating power is disclosed. The output of the blocking oscillator is rectified and then applied to a low-frequency relaxation oscillator, the output of which varies with the capacitance sensed by an antenna connected to one of its branches. The output of the low-frequency relaxation oscillator controls the energization of a relay by means of intermediate solid state switching circuitry. A latching circuit maintains the relay in an energized state until a reset button is manually actuated. The blocking oscillator consumes only a small amount of standby power so that the device can be operated continually.

PATENTED MAR 9 1971 3,569,728

INVENTOR
CARL E. ATKINS

BY
Eyre, Mann & Lucas
ATTORNEYS

CAPACITANCE-RESPONSIVE CIRCUIT

The present invention relates to a capacitance responsive circuit having a low standby power drain capability. More specifically, the present invention is embodied in a capacitance responsive circuit utilizing a power conversion circuit which serves to convert 10 volt DC power into high-frequency pulses of AC power having a peak voltage substantially greater than the value of the applied DC voltage.

Numerous applications may be found for such a circuit. For example, the circuit could be used as a burglar alarm, a fluid level detector, or perform any similar warning function independently of a remote source of power. The desirability and the necessity for the operation of such a circuit in the event of failure of the main source of power is clear. The embodiment of the invention disclosed herein has an extremely low standby current drain off 2 to 3 milliamperes, and is thus well suited for such operations.

A better understanding of the present invention may be had by reference to the accompanying drawings, of which:

Figure 1:
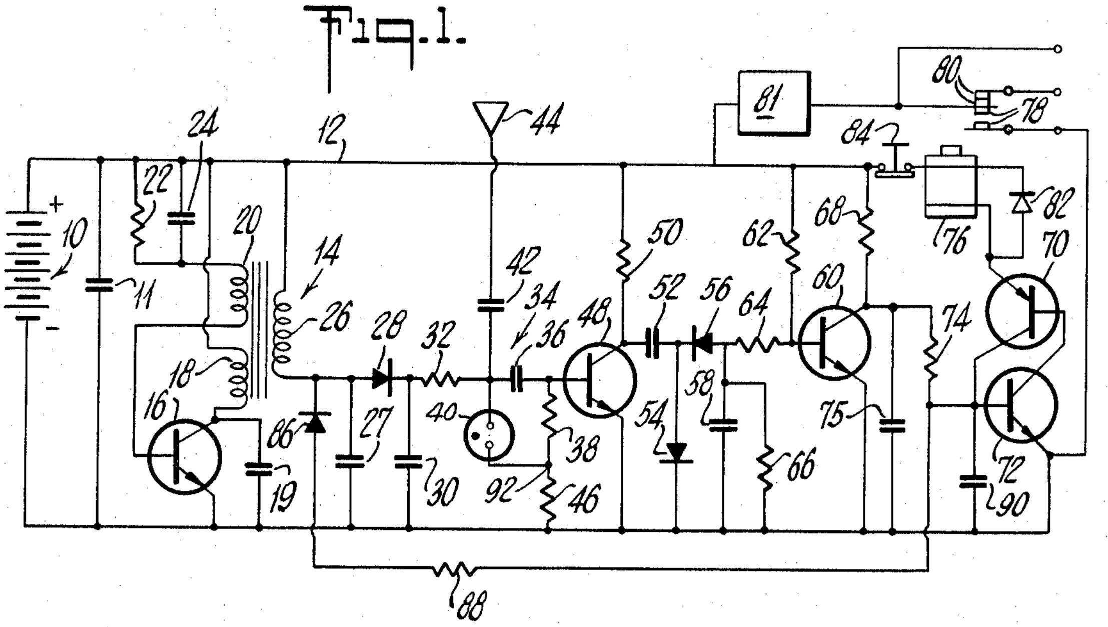
FIG. 1 is a schematic diagram of a capacitance responsive circuit embodying the present invention.

Referring now specifically to the embodiment of the invention shown in FIG. 1, battery 10 connected in parallel with capacitor 11 provides direct-current power to the blocking oscillator 14, which comprises a transistor 16 having its emitter-collector path connected in series with winding 18 between power conductors 12 and 15. Capacitor 19 is connected across the emitter and the collector of transistor 16. The emitter-base current path is connected in series with winding 20 and parallel-connected resistor 22 and capacitor 24 between conductors 12 and 15. Output winding 26 is connected to the positive terminal of battery 10 and is magnetically coupled with windings 18 and 20. The oscillator output is applied from winding 26 through a first rectifier circuit including a capacitor 27 and a diode 28 to charge capacitor 30 intermittently. Thus, a sufficiently high voltage level is provided through resistor 32 to low-frequency relaxation oscillator 34, which is of the type disclosed in U.S. Pat. No. 3,275,897, issued to Carl E. Atkins on Sept. 27, 1966. Relaxation oscillator 34 comprises two RC circuits having a common branch including a voltage breakdown element, such as a neon tube as shown in FIG. 1.

The first RC circuit is formed by series-connected capacitor 36 and resistor 38 bridging the neon tube 40. The second RC circuit is formed by the capacitor 42 and the capacitance to ground of an antenna 44 and resistor 46. The output of the relaxation oscillator consists of the net voltage across the series-connected resistors 38 and 46. This output may be varied by varying the capacitance to ground of antenna 44. The output of relaxation oscillator 34 is fed to the base of amplifying transistor 48, the collector-emitter current path of which is connected in series with resistor 50 between conductors 12 and 15.

The output of amplifying transistor 48 is fed to a low-voltage load circuit connected between the collector and the emitter of transistor 48. This load circuit includes a series capacitor 52 and a second rectifier circuit comprising diodes 54 and 56 together with a shunt capacitor 58. The second rectifier circuit rectifies the low frequency output of oscillator 34 and applies a direct current negative voltage to the base of switching transistor 60 whenever the relaxation oscillator circuit generates a nonnull output voltage. Transistor 60 is biased for conduction by a voltage divider which includes resistors 62, 64 and 66. A load resistor 68 is connected between the collector of transistor 60 and the positive supply conductor 12.

The output of transistor 60 is applied to a semiconductor switch combination which includes transistors 70 and 72. Connection is made from the collector of transistor 60 to the base electrode of transistor 72 in series with a limiting resistor 74. A filtering capacitor 75 is connected across the collector and the emitter of transistor 60. The transistor combination 70—72 is connected in the regenerative feedback configuration so that, once conduction is established, current will continue to flow until the circuit is broken. This feedback configuration comprises connections between the base of each transistor and the collector of the other transistor.

The semiconductor switch 70—72 is connected in series with a relay winding which operates contacts 78 and 80 to control a load 81 which may be an alarm. The winding 76 is bridged by a diode rectifier 82 for absorbing the current pulses generated by the winding whenever its magnetic field collapses. A reset switch 84 is connected in series with the winding 76 and the battery 10 for resetting the circuit to its normal state after the relay has been operated.

The semiconductor switch 70—72 is of the type which remains conductive once conduction has been established. In this regard it is similar to a silicon controlled rectifier or a thyratron. It is necessary to apply a definite negative bias to the base electrode of transistor 72 to maintain the combination 70—72 normally nonconductive. In this case, the negative bias is derived from the oscillator output by a diode 86 in series with a resistor 88. Diode 86 passes a small portion of each negative half of the output wave and these pulses are stored by capacitor 90. In this manner the combination 70—72 remains nonconductive until transistor 60 is biased for nonconduction and its collector electrode is raised in potential to be equal to the potential of conductor 12.

The operation of the circuit shown in FIG. 1 is as follows: As soon as the power is turned on, the blocking oscillator 14 operates to produce a series of AC pulses across winding 26, each including a plurality of high frequency alternations. These are applied to rectifier circuit 28, 30 and a direct current voltage is applied through resistor 32 to the relaxation oscillator 34. The output of this oscillator is variable by varying the values of resistors 38 and 46. These resistors are adjusted so that, under normal conditions, the net voltage across the combined resistors 38 and 46 is substantially zero, and therefore no signal is applied to the base of transistor 48. Under these conditions, transistors 48 and 60 both pass current and the transistor combination 70—72 is a nonconductive.

Now, let it be assumed that a person or an object moves into proximity with antenna 44, thereby increasing its capacity to ground. Current through resistor 38 is increased and negative pulses are applied to the base of amplifying transistor 48, making the base of transistor 60 more negative and making the collector-emitter circuit nonconductive. This action applied a positive potential to the base of transistor 72, causing the pair 70—72 to pass current and remain in a conductive condition. The current through pair 70—72 passes through relay winding 76, opening contacts 80 and closing contacts 78, to sound an alarm 81 or give some other indication that a person or conductive object has been brought near to antenna 44. After the alarm has been observed, and the proper action taken, the entire circuit may be reset by operating switch 84 to normalize the relay. If the person or object moved out of proximity with the antenna 44, the circuit is then in its original condition.

Figure 2:
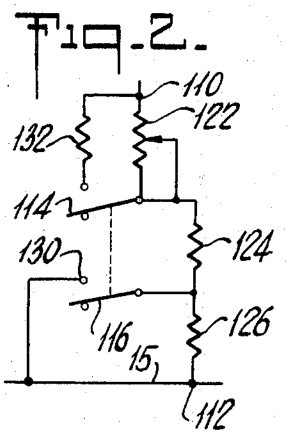
FIG. 2 is a diagram of a high-low range switch designed to be substituted in the relaxation oscillator section of the circuit shown in FIG. 1.

Referring now to FIG. 2, a resistance switching network is shown, designed to be substituted in the relaxation oscillator in place of resistor 46 to provide a high-low sensitivity switch. The network comprises ganged switch blades 114 and 116, operated together, to changed both resistive values in the output circuit of oscillator 34. When in the high range position shown in the FIG., the maximum resistance appears between terminals 110 and 112. This resistance comprises, in series, resistors 122, 124 and 126. When in the low position, that is, when blade 114 makes contact with point 128 and blade 116 makes contact with point 130, the net resistance between terminals 112 and 110 comprises the effective value of resistor 122 connected in parallel with resistor 132, added to resistor 124, resistor 126 being completely shunted by blade 116 through contact 130. Switching from the high range to the low alters the sensitivity of the circuit.

Figure 3:
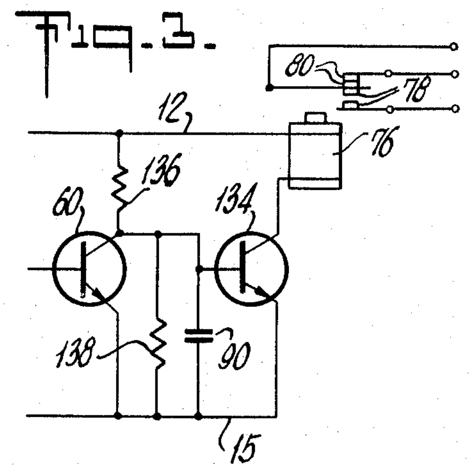
FIG. 3 is a diagram of an alternate output stage which can be substituted for the output stage shown in FIG. 1.

The circuit arrangement shown in FIG. 3 is an alternate output stage using a single transistor 134 instead of the pair combination 70—72. The operation is substantially the same except the circuit has no latching means. Transistor 134 is normally biased for nonconduction by the voltage divider 136, 138.

Figure 4:
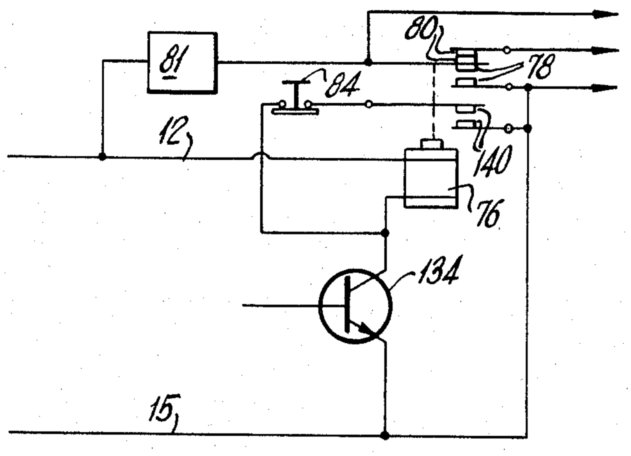
FIG. 4 is a diagram of another alternate output stage which includes a relay having a latching circuit.

FIG. 4 shows another output circuit similar to FIG. 3 but having a latching means as part of the relay. When winding 76 is provided with operating current, latching contacts 140 close and provide a holding circuit which may be traced from the positive conductor 12, through winding 76, then through the normally closed reset switch 84 and closed contacts 40, to the negative conductor 15. As before, operation of switch 84 opens the latching circuit and restores the circuit to its normal condition.

The advantages of the present invention, as well as certain changes and modifications to the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

I claim:

1. A capacitance-responsive circuit comprising:

1. first circuit means including a low-frequency relaxation oscillator and being operative to control the energization state of a load;
2. second circuit means including a blocking oscillator and being operative to convert low-voltage direct-current input power to direct-current output power of sufficiently increased voltage to render oscillatory said low-frequency relaxation oscillator; and
3. signal input means connected to said low-frequency relaxation oscillator and operative to cause said first circuit means to change the energization state of a load in response to a signal of a predetermined minimum level.

2. The capacitance-responsive circuit according to claim 1 wherein said second circuit means includes conversion circuit means for converting the output of said blocking oscillator to a substantially constant direct current voltage.

3. The capacitance-responsive circuit according to claim 1 wherein said first circuit means includes amplifier circuit means operative to amplify the output signal of said low-frequency relaxation oscillator.

4. The capacitance-responsive circuit according to claim 3 wherein said amplifier circuit means comprises first and second amplifier stages interconnected by a low-voltage load circuit.

5. The capacitance-responsive circuit according to claim 4 wherein said low-voltage load circuit includes rectifying means operative to convert the output of said first amplifier stage to a direct current voltage to be amplified by said second amplifier stage.

6. The capacitance-responsive circuit according to claim 3 wherein said first circuit means includes a switch which is connected to and controlled by the output of said amplifier circuit means, said switch being operative in response to said output to open or close a current path.

7. The capacitance-responsive circuit according to claim 1 wherein said low-frequency relaxation oscillator includes a high-low sensitivity switch.

8. The capacitance-responsive circuit according to claim 1 wherein said first circuit means includes an electromagnetic relay, the coil of said relay being connected in said current path controlled by said switch.

9. The capacitance-responsive circuit according to claim 8 wherein said first circuit means includes latching circuit means operative to maintain said electromagnetic relay energized.

10 The capacitance-responsive circuit according to claim 9 wherein said first circuit means includes a reset switch to open said latching circuit means to deenergize said relay.